Patented Dec. 9, 1952

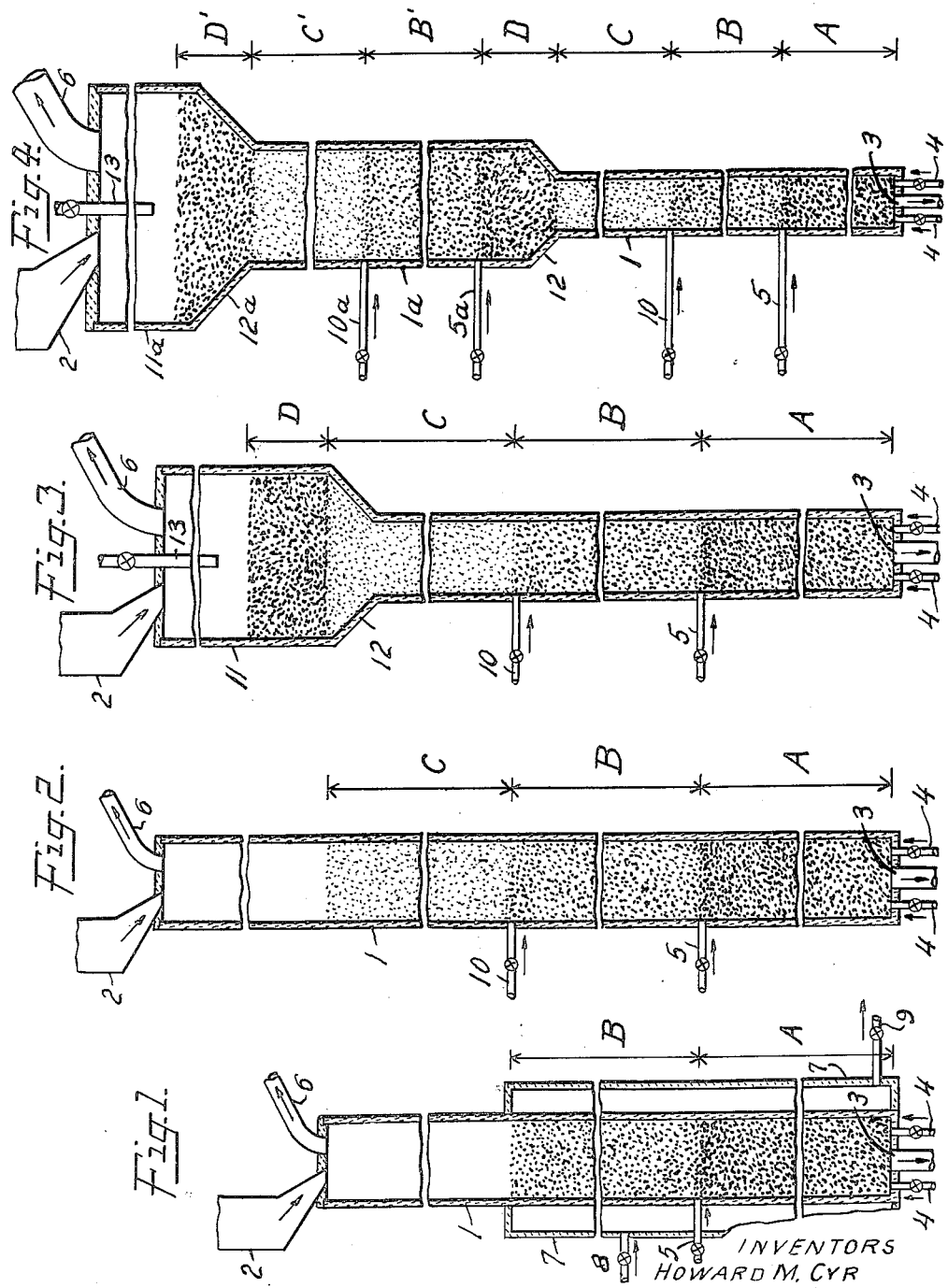

2,621,118

UNITED STATES PATENT OFFICE 2,621,118

PROCESS FOR FLUID BED OPERATION

Howard M. Cyr, Charles W. Siller, and Tracey F. Steele, Palmerton, Pa., assignors to The New Jersey Zinc Company, New York, N. Y., a corporation of New Jersey Application February 5, 1949, Serial No. 74,813

7 Claims. (Cl. 75—9)

This invention relates to fluid bed contact between solids and gases and contemplates a novel method of such fluid bed operation.

It is known that particularly effective contact between a solid and a gas can be obtained by fluid bed operation. The fluid bed is obtained by passing the gas upwardly through a mass of discrete particles of the solid, the flow of gas through the mass of solid particles and the size of the particles being so correlated that the mass of particles is expanded. In the resulting expanded condition the mass of particles of the solid behaves like a fluid. When the flow of gas through the mass is only sufficient to provide such an expanded condition, the mass is merely fluid and very little circulation of particles throughout the mass is obtained. When, however, the flow of gas through the mass is substantially increased, fluid bed conditions are obtained characterized by pronounced agitation of the mass of solids and by considerable circulation of the particles therein. The effectiveness of the contact between the solid and the gas is of course greater when agitation and circulation is obtained in the fluid bed, but this same agitation and circulation tends to minimize the utility of such an operation in a continuous process. Where, for example, the particles of the solid are continuously charged to the upper portion of the fluid bed and particles of the solid are removed from the lower portion of the bed, the discharged particles include not only those which have had adequate opportunity for contact with the gas but also a considerable proportion of particles which have short-circuited the bed as a result of the circulation and which have therefore had an insufficient retention period for the needs of the process.

It has been recognized that the aforementioned limitation on the utility of fluid bed operation in carrying out a continuous process for effecting contact between a solid and a gas could be overcome by using a plurality of such beds in which the solids progressed from one bed to another. The concept of multiple fluid bed operation has been applied in practice heretofore by supporting masses of the particles of the solid on separate grates or the like generally positioned one above another, the particles of the solid leaving one bed being transferred mechanically to the next succeeding bed in the series. Although this procedure makes it possible to attain the desired period of retention between the solid and the gas, and further permits the use of a single gas supply for the first bed in the series to be used successively as the fluidizing medium in each succeeding bed, the use of mechanical means such as grates for maintaining the individual beds has been found to be unsatisfactory. Thus, it has been found difficult to eliminate dead spaces around the border of such grates wherein very little if any contact is effected between the solid and the gas. Moreover, there is a tendency for the particles of solid to fill up and plug the openings in such grates, and the inaccessibility of the grates within the enclosing vessel has made it difficult to maintain smooth and uninterrupted operation. Further difficulty is experienced in obtaining structural materials for such grates that will resist deterioration under the conditions prevailing within the contacting zones.

We have now discovered that fluid bed contacting between a solid and a gas can be effected in a plurality of stages wherein these stages are established and maintained by separate gas supplies without the use of grates or other mechanical means for maintaining the several fluid bed stages. The resulting operation is characterized by all of the advantages of multi-bed operation and is free from the disadvantages of such prior art operation. The absence of grates within the vessel in which the operation is carried out eliminates dead spaces and insures uniform and completely controllable contact between the solid and the gas. It will be seen, accordingly, that we have devised an improvement in the method of effecting contact between a solid and a gas wherein a mass of discrete particles of the solid is expanded to fluid bed condition by the passage of the gas upwardly therethrough. This improvement in accordance with our invention comprises introducing the gas in the form of a plurality of separate portions into vertically spaced portions of the mass sufficient in amount to provide an expanded fluid condition throughout the mass. The introduction of a plurality of portions of the gas into the mass of discrete particles of the solid thus establishes in the mass a plurality of superimposed fluid beds in direct solid and gaseous communication with one another in the form of a fluid column. We have found that the resulting maintenance of a plurality of superimposed fluid beds solely by means of the introduction of a plurality of portions of the gas into vertically spaced portions of the mass of solid particles without the use of any mechanical means for maintaining these beds is particularly amenable to the establishment and maintenance of a different degree of fluid agitation in each of the superimposed fluid beds. By maintaining controllably different degrees of agitation in the successive stages or bed zones in the fluid column, processes for effecting contact between a solid and a gas can be carried out with the ultimate in flexibility and efficiency, the bed in each stage or zone conforming to the definition of a "fluid bed" in the article entitled "Fluidization Nomenclature Proposed" appearing in Chemical and Engineering News, March 7, 1949, pages 686 and 726.

These and other novel features of the invention will be more fully understood by reference to the following description taken in conjunction with the drawings in which Fig. 1 is a cross-sectional elevation through a vessel in accordance with the invention in which two fluid beds are maintained;

Fig. 2 is a cross-sectional elevation through another form of vessel in which three superimposed fluid beds may be maintained;

Fig. 3 is a cross-sectional elevation through a vessel similar to that shown in Fig. 2 further provided with an enlarged section thereabove having the advantages described hereinafter; and Fig. 4 shows apparatus comprising a multiple contacting vessel embodying the features shown in Fig. 3.

The apparatus shown in Fig. 1 comprises a vertically disposed vessel 1 defining a columnar chamber of substantially uniform cross-sectional area throughout its length. A suitable charging device such as a hopper 2 communicates with the upper end of the vessel 1 for the delivery of the solid material thereto. The solid material is removed from the lower end of the vessel 1 through a discharge outlet 3. A gas supply to the bottom of the vessel is provided by one or more valved gas inlets 4, and a second gas supply is provided by one or more valved gas inlets 5 positioned a substantial distance above the lower gas inlet and approximately adjacent the intermediate portion of the vessel 1. All of the gaseous material is advantageously removed from the contacting chamber through a gas outlet 6 adjacent the upepr end of the vessel 1, and thus an upward flow of gas is maintained through the mass of charged particles therewith. The entire vessel may be enclosed by a temperature controlling jacket 7 having an inlet 8 and an outlet 9 for a temperature controlling medium for either supplying heat to or removing heat from the vessel 1 if such temperature control is desired.

Operation of the apparatus in accordance with our invention is characterized by its simplicity. The discrete particles of a solid are charged continuously into the vessel 1 from the hopper 2, and the gas which is to be contacted with the solid is introduced into the mass of charged particles through the inlets 4 and 5. By appropriate correlation of the size of the particles of the solid, the relative amounts of the gas introduced through the aforementioned inlets, and the dimensions of the columnar chamber within the vessel 1, two stages of fluid bed contacting are established within the chamber each of which is characterized by a fluid condition of the mass of discrete particles therewithin.

The correlation of the particle size and gas supply with the cross-sectional dimensions of the vessel are well known in the art and need not be discussed here. We have found it particularly advantageous to introduce through the lowermost gas inlets 4 a sufficient amount of the gas to expand the mass of solid particles thereabove to such an extent that their apparent density in the lower portion of the vessel 1, represented by the zone identified as "A" in the drawing (Fig. 1), will be approximately 75–90% of the bulk density of the mass of charged particles. We have also found it to be advantageous to introduce through the next upper gas inlet 5 such an amount of the gas as to establish thereabove a zone, identified as "B" in the drawing, in which the apparent density of the fluid mass of solid particles will be approximately 55–75% of the bulk density of the mass of charged particles. The expression "apparent density" as used herein and in the claims means the fluidized density of the mass, that is, the density of the fluidized mass expressed in terms of the weight of a unit volume of the fluidized mass.

We have found that smooth operation of a solid-gas contacting process is aided by providing the charged particles with a size distribution varying throughout a substantial range. Thus, we have found that although particles of substantially a single size are amenable to fluid bed operation and may be used satisfactorily in the method of our invention, the more impervious bed provided by a particle size distribution within a considerable particle size range favors the establishment and maintenance of fluid bed conditions. The maximum and minimum particle sizes which may be used in accordance with the invention, whether the particles are of a single size or are of many sizes distributed throughout a size range, are those which are well understood in the art. The optimum particle size is determined by a complex relationship between the density of the particles of the solid, the nature of the surface of these particles, and the maximum rate of gas flow which, in turn, is dependent upon the nature of the solid-gas contact process and the contact period which is desired. The maximum particle size is determined by the ability of the gas, flowing within the permissible rate, to hold the particles in partial suspension, and the minimum particle size is determined by the tendency of the fine particles of charged material to be carried by the stream of gas and thus be removed from the zone of operation. Accordingly, the size distribution should be limited to these maximum and minimum particle sizes which can be definitely ascertained most satisfactorily by trial and error.

The variation in particle size or in particle size distribution range with the density and nature of the particles of solid material which may be contacted with a gas in accordance with our invention is illustrated by the following specific examples. In the gasification of anthracite coal by contact with steam to produce hydrogen and carbon monoxide, anthracite having a specific gravity of 2.1 is advantageously ground and screened to produce particles which are through 14 and on 65 mesh (Tyler standard). The bulk density of a mass of such particles without expansion to effect fluidization is about 48 pounds per cubic foot. Of course, both the size and bulk density will decrease as the contacting reaction progresses, but this range of particle size is desirable for the charge introduced into the fluid column. In the calcination of the calcium carbonate content of Sterling Hill zinc ore by contacting it with hot air, the ore which has a specific gravity of 2.7 is ground and screened to through 4 and on 35 mesh to produce a satisfactory charge for the fluid column. The bulk density of such a charge is about 70 pounds per cubic foot. In the preferential chlorination of the iron content of ilmenite beach sand by contacting the sand with chlorinating gases, sand having a specific gravity of 4.8 and screened to through 65 and on 150 mesh produces a suitable fluid column charge having a bulk density of about 150 pounds per cubic foot. In a process for preheating iron-titanium ore by passing it through a fluid column in contact with hot gas which serves as the fluidizing medium, a suitable fluid column charge is produced by grinding and screening an iron-titanium ore having a specific gravity of 4.8 to a particle size range of through 6 and on 35 mesh. The resulting mass of charge particles has a bulk density of about 145 pounds per cubic foot. In the roasting of a zinc sulfide ore concentrate the fine particles of which are aggregated and then screened to produce a mass of discrete particles, the aggregated particles are charged to the fluid column where they are roasted in contact with air as the fluidizing medium. The sulfide ore concentrate, having a specific gravity of 4.1, should be aggregated to yield a charge having a discrete particle size distribution falling within the range of through 6 and on 65 mesh, and preferably through 8 and on 35 mesh. The resulting charge has a bulk density of about 92 pounds per cubic foot.

The amount of gas used in effecting fluid column contacting of the solid and gas in accordance with our invention need be only that theoretically required to effect the desired result. With a vessel of a certain cross-sectional area, whether of cylindrical or rectangular shape, a definite rate of gas flow is required to establish and maintain fluid bed conditions within the vessel for any solid the particles of which fall within the determined optimum size range. The period of contact between the solid and the gas can thus be adjusted by an appropriate selection of the total depth of the plurality of fluid beds which make up the fluid column. With the depth of the fluid column thus ascertained, the plurality of superimposed and directly communicating fluid beds are obtained by introducing a portion of the total amount of the gas into the lowermost portion of the bed and by introducing the remainder of the gas either at a single level positioned approximately intermediate the vertical height of the bed as hereinbefore described or at a plurality of levels vertically spaced throughout the mass as more fully described hereinafter. It will be seen, accordingly, that the method of the invention is adapted to establish and maintain a plurality of superimposed fluid beds in direct solid and pneumatic communication with one another when using only that amount of gas theoretically required to complete the solid-gas contacting operation which is contemplated. It will be apparent, of course, that more than the theoretical amount of gas may be passed in contact with the solid material in order to afford a margin of safety which will insure completion of the result which it is desired to obtain by the contact between the solid and the gas. This result can be achieved either by increasing the rate of flow of the gas through the fluid beds while maintaining the aforementioned expanded conditions in the mass of solid particles, or this result may be obtained by decreasing the total height of the fluid column or by decreasing the rate at which the particles of solid pass through the column, or by any combination of these expediencies.

Distribution of the gas between separate portions of the fluid column may be varied considerably in practicing the invention. For example, an expanded fluid condition can be maintained in the lower portion of the charge by using as little as 15 to 20% of the total gas supply as the fluidizing medium therefor. Inasmuch as a further increase in the percentage of the total gas introduced into the bottom of the column merely increases the degree of agitation of the fluid mass in the lower portion of the charge, we have found that there is generally no advantage in using more than about half of the total gas as the fluidizing medium in the lower portion of the charge. Thus, we prefer to use at least one-half of the total gas supply as the second supply of fluidizing medium introduced into the intermediate or other upper portions of the column. The increased volume of gas provided in the column above the lowermost fluid bed promotes more violent agitation of the mass in the zone above the second gas inlet. Consequently, a major portion of the result to be accomplished by solid-gas contact is generally effected above the second gas inlet 5, and completion of the contacting result is effected in the more quiescent but nevertheless fluid zone between the lowermost gas inlet and the second gas inlet.

Although the method of our invention contemplates using as few as only two vertically spaced gas supplies to establish a fluid column of the solid material comprising two directly communicating stages of fluid bed contacting having different degrees of agitation, we have found it particularly advantageous to supply a portion of the total amount of gas as a third supply above the second gas inlet 5. When the invention is practiced in this manner, a portion of the gas is supplied through one or more valved inlets 10, as shown in Fig. 2, positioned a vertically spaced distance above the second gas inlet 5 and capable of introducing this further portion of the gas into the uppermost portion of the fluid column. The portion of the total gas supply which may be used for this purpose may range between from about 10% to about 40%, although we presently prefer to use about 20% of the total gas as this third gas supply. When a portion of the total gas is thus used as the third gas supply, the fluid column of charge is divided into three directly communicating beds or stages, the lowermost stage comprising zone A characterized by fluid action with mild agitation, the second stage comprising zone B with more active fluid bed agitation, and the third stage comprising zone C characterized by violent fluid bed agitation. The desired fluid bed conditions are thus established in the fluid column with the result that the apparent densities of the solids in the three zones A, B and C comprise 75–90%, 55–75% and 50–60%, respectively, of the bulk density of the mass of charged particles.

In solid-gas contacting operations ranging from the contacting of sand with a gas to the roasting of sulfide ore by contacting it with air, we have ascertained partly by inspection and partly by means of probes inserted from the top of the charge column downwardly into each of these stages that fluidization takes place in the lowermost zone A with agitation provided by rising gas bubbles. More violent fluid bed agitation occurs in zone B due to the formation of more and possibly larger gas bubbles. Violent fluid bed agitation occurs in zone C to such an extent that a pronounced surging or pulsation has been noted in this zone. As a result of thorough investigation of this action in zone C, we believe that a fluid bed is progressively built up in the lowermost portion of zone C by a descending shower of particles from the top of the vessel and that when this bed attains such a depth as to become so impervious to the rapid flow of gas therethrough as to build up a substantial gas pressure beneath it, the fluid mass appears to disintegrate in the manner of a minor explosion. The resulting rain or shower of particles downwardly through zone C again builds up a similar bed, and the explosion-like pulsation is again produced. Such violent agitation as that obtained in zone C affords contact between the charged particles and the rising gas such as to produce highly effective contacting conditions between the solid and the gas.

When the invention is practiced by introducing the fluidizing gas into two separate portions of the fluid column within the vessel 1 in order to establish therein two fluid bed contacting stages, the active agitation of fluidized charge in the upper zone B produces only a slight tendency toward loss of fines by being blown upwardly out of the upper fluid mass. When the invention is practiced using three gas supplies in order to maintain three stages of fluid bed contacting within the vessel 1, the uppermost stage is characterized generally by such violent agitation as to increase the tendency for fine particles to be blown out of this uppermost fluid mass. The loss of fine material carried upwardly out of the top of the fluid column in the course of either type of operation may be minimized by providing an enlarged chamber above and in communication with the top of the main vessel 1. The upper enlarged chamber may have any appropriate configuration which will serve to diminish the velocity of the gases leaving the uppermost fluid bed so that the fines may settle out and return to the top of the fluid column. Although this result may be obtained by providing the upper enlarged chamber with an upwardly and outwardly flaring zone in the form of an inverted truncated cone, we have found it particularly advantageous to construct the upper chamber in the form shown in Fig. 3. In this preferred form of the apparatus, the upper chamber 11 is of cylindrical shape having a cross-sectional area substantially greater than that of the main vessel 1. Direct communication between the two chambers of different cross-section may be provided advantageously by a connecting tapered throat 12 which serves to facilitate movement of the charge from the upper chamber into the top of the lower main chamber in vessel 1 while minimizing the establishment of dead spaces adjacent the lower end of the upper large chamber 11.

We have found that it is possible to maintain in the lower portion of the upper large chamber another fluid bed of the particles of charged material which serves not only as a pervious covering over the upper violently agitated fluid bed within the main vessel 1 but also as a primary contacting stage. This uppermost fluid bed stage is identified as zone "D" in Fig. 3. The contacting initiated in zone D thus increases the capacity of the furnace, and in many instances may serve the additional useful function of effecting preliminary conditioning of the individual charge particles to such an extent that they are resistant to disintegration when subjected to the violent fluid agitation prevailing particularly in zone C. Such conditioning is especially advantageous where the charge particles are obtained by aggregation of much finer particles and are held together by a binder. In the case of high temperature contacting operations, the preliminary conditioning of the charged particles may comprise a partial sintering together of the finer particles which make up each of the larger but discrete charge particles without, however, causing bed sintering.

The cross-sectional area of the upper large chamber 11 is advantageously such that the total volume of gases rising from the top of the main vessel 1 will provide in zone D a mildly agitated, expanded fluid condition in the mass of charge particles. When the cross-sectional areas of the upper chamber 11 and the lower main vessel 1 are appropriately correlated, the activity in the fluid bed in the uppermost zone D may be made approximately the same as that prevailing in zone B, and in general we have found this correlation to be desirable but not essential.

The method of our invention may be used with advantage in a wide variety of processes wherein a solid is to be brought into contact with a gas. Such processes may involve mere physical contact such as heat exchange for the purpose of recovering the sensible heat of a gas or the sensible heat of a finely divided solid. This heat exchange may be utilized in a number of ways, including the heat exchange between a hot gas and relatively cool solid material which must be preheated before being charged to a subsequent treatment. Such a simple heat exchange operation may be illustrated by the preheating of an iron-titanium ore preliminary to subsequent furnacing. The ore, having a specific gravity of 4.8 and ground to through 6 on 35 mesh, is heated by passing it continuously through the fluid column and introducing into the column as the fluidizing medium therefor a mixture of a heating gas and air which provides the desired heating of the ore by its combustion within the column.

A process involving the mere physical contact between a gas and a solid but in which the nature of the solid is altered may be illustrated by a calcination treatment. In such treatment, the fluidizing gas may contain, or may provide by its combustion with the mass of solid particles, much or all of the heat required for calcination, or relatively cool fluidizing gas may be used and the heat for calcination may be provided by a heating medium such as heating gas introduced into and burned within the temperature controlling jacket 7 enclosing the main vessel 1. For example, the method of the invention may be used for the calcination of the calcium carbonate gangue in an ore. Illustrative of such an operation, effective results are obtained by the treatment of Sterling Hill zinc ore containing approximately 25% calcium carbonate and ground to a particle size distribution such that the particles will pass through a 4 mesh screen (Tyler Standard) but are retained on a 35 mesh screen. The calcium carbonate content of the ore is readily decomposed under the fluid bed conditions prevailing within the fluid column in accordance with the invention by the introduction of air into the gas inlets, the fluid mass being maintained at a temperature of approximately 1000° C. by introducing a heating gas and air into the jacket 7 and burning the mixture therein. Alternatively, the fluidizing medium may comprise a mixture of the heating gas and air (or even oxygen-enriched air or oxygen alone), the combustion of the heating gas within the mass of particles of the solid thus providing the desired heat for effecting calcination. It will be appreciated that the relative proportions of heating gas and air (or the like) may differ in the gas mixture supplied to different portions of the mass of particles within the fluid column in order to obtain any desired thermal conditions in the various zones throughout the column.

The method of the invention is also applicable to the contacting of a solid with a gas in a process in which chemical reaction takes place between the solid and the gas. For example, anthracite coal may be gasified by introducing steam as the fluidizing medium for a bed of the coal having a specific gravity of 2.1 and ground to through 14 on 65 mesh. The contact between the steam and anthracite, externally heated by the combustion of a heating gas within the jacket 7 to a temperature of about 1100° C., results in the efficient production of a gaseous product comprising hydrogen and carbon monoxide which is withdrawn from the gas outlet 6.

A further example of a chemical action between a gas and a solid in accordance with our invention comprises the chlorination of ilmenite beach sands. Ilmenite sand, having a specific gravity of 4.8 and a screen size of through 6 on 150 mesh, is preferentially chlorinated to remove the iron content of the sand by passing the sands progressively downwardly through the fluid column and using a chlorinating gas as the fluidizing medium. At a temperature of 1000° C., maintained by external heating as described hereinbefore, the iron content of the sand is preferentially chlorinated with the resulting production and vaporization of ferric chloride which is removed with the exhaust gases through the gas outlet 6.

The contacting of a solid and a gas in accordance with our invention may also be used in a mixing process wherein it is desired to effect thorough admixture of two or more solid materials. In such operation, the plurality of solid materials screened to appropriate size are charged to the top of the vessel 1 and are maintained under fluid bed conditions in accordance with the invention by the introduction of any appropriate fluidizing gas such as air into the gas inlets. The extensive circulation of solid material within the fluid column promotes efficient admixture of the solid materials without short circuiting so that the materials may be removed from the lowermost end of the vessel 1 in a thoroughly and uniformly mixed condition.

The roasting of sulfide minerals illustrates the application of the method of our invention to a chemical treating process. Particles of sulfide minerals as small as those just retained on a 65 mesh screen (i. e. a screen having openings approximately 0.208 mm. in diameter) can be handled by the method of our invention, although particles of such small size tend to cause dusting and are difficult to retain within the furnace. Particles of increasing size up to about 35 mesh offer decreasing difficulty with dusting, and particles at least as large as on 35 mesh appear to produce optimum results. The upper size limit for the particles appears to be that corresponding to particles which will pass through a 6 mesh screen. Particles larger than 6 mesh can be fluidized only with difficulty by the upwardly rising stream of air within the furnace. Moreover, particles larger than 6 mesh are more slowly roasted and tend to emerge from the furnace with a core of unroasted ore. We have also found that such large particles tend to promote greater abrasion of other particles in the fluid mass with the resulting production of dust-like particles which in turn tend to be blown out of the furnace. In general, we have found that best results are obtained when the largest particles in the charge are those which will pass through an 8 mesh screen. Thus, the maximum range of size distribution which we have found to be amenable to fluid column roasting in accordance with our invention is represented by discrete particles which will pass through a 6 mesh screen but are retained on a 65 mesh screen. Optimum results, including the minimum of dusting and most effective roasting, are obtained when the charge comprises a mass of particles which will pass through an 8 mesh screen but are retained on a 35 mesh screen.

Although the aforementioned particle size range may be considered as the range of sulfide particles of a single size which may be used in practicing the invention, we have found it advantageous to use a charge containing particles having a size distribution extending throughout the entire recited ranges. We believe that the advantage in using a mixture of sizes within the aforementioned ranges lies in the fact that the mixture of fine particles and large particles results in a more impervious bed which contributes to more effective fluidization of the charge and attendant smoother operation. However, we have found it possible to start operation with all particles of a single size, but when this procedure is followed we have found that the attrition of the particles resulting from agitation within the fluid bed produces finer particles and thus tends to establish the optimum bed condition of a mixture of many different particle sizes.

The sulfide ore charge composed of discrete particles having a size distribution falling within the aforementioned ranges may be produced in any one of several ways. If relatively coarse ore is to be treated, the desired size distribution can be obtained simply by conventional grinding procedures. When such coarse ore is ground in preparation of the charge, the ground ore should be screened in order to obtain a particle size distribution within the specified ranges. When the source of ore comprises finely divided material finer than that desired as the charge, the fine material may be aggregated in any suitable manner. For example, we have obtained wholly satisfactory results by wetting fine sulfide ore concentrate with sulfite liquor and water, densifying the resulting mass in a chaser, extruding the densified mass through openings, followed by drying and crushing to size. When sulfite liquor is used for this purpose, we have found that from 2 to 5% sulfite liquor and 6 to 10% total water gives satisfactory results. Inasmuch as the sulfite liquor is approximately 50% water, this water content of the sulfite liquor must be taken into consideration in making up a plastic mass containing the specified total amount of water. Other binders such as zinc sulfate and Bentonite have been used successfully in lieu of the sulfite liquor. Other methods of aggregation have also been used such, for example, as compressing the plastic mass between rollers and then breaking up the resulting flakes to the desired size. Pelleting and other conventional procedures have also been used successfully. Regardless of the means by which they are obtained, discrete aggregates of sulfide ore having sizes ranging between through 6 and on 65 mesh, and preferably through 8 and on 35 mesh, are amenable to the establishment of a fluid column for practicing the invention.

The amount of air required for effecting fluid column roasting in accordance with the invention need be only that theoretically required to roast the ore. We have successfully roasted zinc sulfide ore in the form of such a fluid column with only a small fraction of 1% of residual sulfide sulfur when using approximately the theoretical amount of air to roast the ore. However, in order to insure against possible variations in operating conditions, we now prefer to use a total amount of air equal to about 1.1 times the theoretical amount of air required for roasting. A larger amount of air can be used, such for example as 2 to 3 times the theoretical requirement, although there generally appears to be no advantage in using more than about 1.5 times the theoretical amount of air. Although the excess of air over that required for roasting the ore merely dilutes the sulfur dioxide in the resulting furnace gases, such larger amounts of air may be advantageous where the coarseness of the charge requires higher gas velocity to obtain the desired charge fluidity or where the furnace-cooling effect of the excess air is desired.

The roasting temperatures prevailing in the two or more roasting stages within the main furnace chamber 1 are approximately uniform. However, the lowermost zone A runs slightly cooler than the upper stage or stages because of the cooling effected by air entering through the lowermost inlet 4 and encountering the nearly completely roasted charge in zone A. The retention period of the charge passing through the roasting furnace in accordance with our invention is sufficient to insure complete roasting of the ore at those temperatures used conventionally for the bed or suspension roasting of the various sulfide ores. In the roasting of zinc sulfide ores, for example, the degree of agitation of the fluidized charge within the roasting chamber is sufficient to permit effective roasting temperatures as low as 900° C. and as high as 1200° C. without encountering such a degree of bed sintering as to interfere with proper operation. However, we have found it particularly advantageous to maintain, by appropriate cooling control, a zinc sulfide roasting temperature within the furnace in the range of about 950° to 1050° C. Within this preferred operating temperature range, the equilibrium of the zinc oxide-sulfating reaction is reversed so as to minimize sulfation of the roasted ore.

The method of our invention is applicable to the treatment of various sulfide minerals amenable to oxidizing roasting. Thus, zinc sulfide-, copper sulfide-, and iron sulfide-bearing minerals may be roasted effectively by our method. We have found that the sulfide sulfur content of any of these minerals may be reduced to 1% or lower by the fluid column roasting in accordance with the invention. The amount of sulfate sulfur remaining in the roasted ore is generally below 4% SO₃ and can be held to as low as 1% SO₃ by the choice of an appropriate ore and of a sufficiently high operating temperature. The presence of certain metallic constituents in the ore appears to have an appreciable effect upon the sulfate sulfur content of the roasted ore. In the roasting of zinc sulfide minerals, for example, the presence of calcium and magnesium in the green ore promotes the presence of residual sulfate sulfur in the roasted ore to an extent depending upon the amount of calcium and magnesium in the ore. Thus, Austinville zinc sulfide ore concentrate, characterized by a relatively high lime and magnesia content, may be roasted effectively at approximately 1000° C. with a residual sulfate sulfur content of about 3 to 4% SO₃. Buchans River ore concentrate, characterized by a lower lime and magnesia content, was also roasted effectively by the method of our invention at a temperature of approximately 1000° C. with a lower residual sulfate sulfur content of about 1.5 to 2.5% SO₃ in the roasted ore. Copper Hill ore concentrate, containing even less lime and magnesia, was roasted at a temperature of approximately 1000° C. to produce a roasted product having a sulfate sulfur content below about 1% SO₃. Calculations based on these results show that the amount of sulfate sulfur in the roasted product corresponded to sulfation only of lime and magnesia. Virtually none of the zinc oxide was sulfated.

The aforementioned ores had the following typical analyses:

|  | Austinville | Buchans | Copper Hill |
|---|---|---|---|
|  | Percent | Percent | Percent |
| Zn (as ZnS) | 88.5 | 77.0 | 76.4 |
| Pb | 0.9 | 3.8 | 0.08 |
| Fe | 2.4 | 3.3 | 12.8 |
| Cu | 0.03 | 0.71 | 0.76 |
| CaO | 1.5 | 0.69 | 0.01 |
| MgO | 1.2 | 0.26 | 0.03 |

Roasting of sulfide ores in accordance with the invention is so effective that a furnace of relatively small size can handle a surprisingly large amount of ore. For example, we have constructed a small furnace in which the main roasting chamber 1 consisted of a refractory tube 38 inches long and having an internal diameter of 4 inches. The large chamber 11 cemented through the medium of a tapered throat 12 to the top of the tube 1 consisted of a refractory tube 17 inches long and having an internal diameter of 9 inches. An Austinville zinc sulfide ore concentrate, having an analysis as noted hereinabove, aggregated with sulfite liquor as aforementioned and having a particle size distribution of through 10 on 35 mesh, and having a bulk density of 92 pounds per cubic foot, was charged to the furnace through the charging device 2 at the rate of 25 pounds per hour, and roasted ore was removed through the discharge opening 3 at the equivalent rate. Approximately 1.1 times the theoretical amount of air required to roast this ore was introduced through the three air inlets 4, 5 and 10. Approximately 20% of the total air supply was admitted through the lowermost air inlet 4, approximately 60% of the total air supply was admitted through the intermediate air inlet 5, and the remaining 20% of the total air supply was admitted through the inlet 10. Probes inserted into the charge in the various zones representing the several roasting stages within the furnace indicated that mildly agitated fluid bed conditions prevailed in the lowermost zone A wherein the mass was in a mild state of motion without appreciable circulation of charge particles therewithin. The apparent density of the solids in this zone was 75 pounds per cubic foot and corresponded to a density of 81.5% of the bulk density of the green ore charge. A more actively agitated fluid bed condition prevailed in the next upper roasting stage comprising zone B wherein the apparent density was 60 pounds per cubic foot, corresponding to a density of about 65% of the bulk density of the green ore charge. Agitation in the next upper roasting stage comprising zone C immediately above the air inlet 10 was still more violent and appeared to be characterized by the pulsating phenomenon described hereinbefore. The apparent density of the charge in zone C, based upon the amount of charge within this space, was about 50 pounds per cubic foot and corresponded to about 54% of the bulk density of the green ore charge. Moderately agitated fluid bed conditions prevailed in the uppermost zone D to the extent that considerable circulation of the ore took place. The apparent density of the fluidized ore in this zone approximated 65 to 70 pounds per cubic foot and was equivalent to a density of 70-75% of the bulk density of the charge. Visual inspection of the charge in zone D showed that this mass seethes and boils as the furnace gases rise therethrough. Preliminary roasting took place in zone D, and further roasting was effected in zone C. Active roasting also took place in zone B, and clean-up roasting was effected in zone A. A substantially uniform temperature of approximately 1000° C was observed in each of zones B, C and D, whereas the temperature in zone A varied from about 1000° C. adjacent the boundary of zone B down to about 300° C. adjacent the discharge outlet 3. Contrary to results obtained in conventional hearth roasting operation, sulfation of the roasted zinc ore did not occur as it cooled through the optimum sulfation temperature of about 700° C. because of the absence of any substantial amount of sulfur dioxide in this lowermost portion of the roasting column. The roasted ore withdrawn from the lower end of the main furnace chamber 1 contained about 0.04% residual sulfide sulfur and about 1% residual sulfate sulfur. The particles of roasted ores were made up of the originally aggregated fine particles of ore concentrate completely roasted and sintered together in the form of discrete particles particularly amenable to further metallurgical treatment without having to be treated in a Dwight-Lloyd sintering machine. The furnace gases removed from the top of the furnace consisted of sulfur dioxide diluted substantially only with the nitrogen content of the air used and with the small excess of fluidizing air above that which combined with the green ore to effect roasting.

The small furnace described hereinbefore required external heating to maintain a roasting temperature within the furnace. However, no heating is required for furnaces appreciably larger than the one previously described, and actually cooling means such as a cooling jacket or internal heat exchanger, or the like, must be provided in larger furnaces in order to dissipate the heat of reaction liberated when a sulfide ore concentrate is roasted. Thus, it will be seen that the method of our invention is autogenous and requires very little attention after stable operating conditions have been attained. To the best of our knowledge, there is no limit to the dimensions of a furnace structure in which the method of our invention can be practiced. The only requirement for furnaces of large size is that the various air inlets be so arranged as to provide uniform distribution of the air at each supply level throughout the charge so as to maintain fluid bed conditions within the charge.

Although the method of our invention has been described hereinbefore in conjunction with the use of either two or three gas supplies for maintaining fluid bed conditions thereabove within the charge of particles of solid material, it must be understood that one or more additional gas supplies may be provided at vertically spaced intervals. Thus, two, three, or four or more zones may be maintained within the vessel 1, the different fluid beds each being in direct communication with one another without the interposition of grates or other mechanical separating means and each of the beds being characterized by a different degree of fluid agitation. Where such a large number of spaced gas inlets are provided, the spacing therebetween may be so small that the successive zones may be characterized by degrees of fluidity which do not differ sufficiently from one another to present distinct boundaries. However, such operation will be characterized by the establishment of a fluid bed in the lowermost portion of the vessel 1 and of fluid bed conditions thereabove of progressively increasing degree of fluid agitation.

When it is desired to provide a longer retention period between the solid and gas than that obtainable in the forms of apparatus shown in Figs. 1, 2 and 3, apparatus such as that shown in Fig. 4 may be used with advantage. Such apparatus comprises a lower main vessel 1 similar to that shown in Fig. 1. The upper end of the vessel 1 communicates through a tapered throat 12 with another vessel 1a substantially larger than the lower vessel 1 but similar in cross-sectional dimension, for example, to the upper chamber 11 in Fig. 3. The upper end of the upper vessel 1a likewise communicates through another tapered throat 12a with an uppermost enlarged chamber 11a which serves the same function as the enlarged chamber 11 in the apparatus shown in Fig. 3. Gas is admitted to the bottom of the lower main vessel 1 through the gas inlet 4, and the second and third gas supplies are provided through the inlets 5 and 10, respectively. These three gas supplies establish in the main vessel 1 three fluid beds of different degrees of fluid activity corresponding to zones A, B and C in Fig. 3. The fluid bed activity in the lower end of the larger vessel 1a corresponds to zone D in Fig. 3, although it may be characterized by somewhat less fluid agitation than zone B and may more nearly correspond to the activity prevailing in zone A. Additional gas inlets 5a and 10a disposed at spaced intervals throughout the length of the upper enlarged vessel 1a establish respectively thereabove two additional fluid beds which may be characterized by activities corresponding to zones B and C in the lower main vessel 1. These zones have therefore been identified as zones "B'" and "C'" in Fig. 4. The fluid bed maintained in the lower portion of the uppermost large chamber 11a advantageously is characterized by substantially the same degree of activity as zone D and has therefore been identified in Fig. 4 as zone "D'." It will be seen that by providing a plurality of superimposed vessels of differing dimensions, as represented by the vessels 1 and 1a in Fig. 4, the amount of gas introduced into the charge of particles of solid material is not limited to that which can be used effectively in a single vessel. Accordingly, two or more vessels of progressively larger cross-sectional area may be built up and operated in accordance with the invention to handle the contacting of any finely divided solid material with a gas to meet any requirements of retention period.

As shown in Figs. 3 and 4, an additional supply of the gas may be directed downwardly against the top of the uppermost fluid bed in zone D by introducing the gas through a valved lance 13 extruding downwardly into the interior of the upper large vessel 11. In gas-solid contacting processes involving chemical interaction, this uppermost gas supply provides additional gaseous reagent in a zone normally impoverished in available gaseous reagent and thereby facilitates initiation of the reaction between the gas and the incoming charge of particles of the solid component. The circulation prevailing in the fluid bed in zone D promotes entrapment in the bed of fresh gas introduced through the lance 13 and thus enhances initiation of the desired reaction. It will be appreciated that the gas introduced through the lance 13 need not be the same gas introduced through the other gas inlets 4, 5 and 10, and may be such as to effect some desired conditioning of the charge prior to its treatment in the fluid column within the main vessel 1.

It will be seen, accordingly, that the method of our invention makes possible the contacting of a solid with a gas in a grateless chamber wherein a plurality of contacting zones are established in direct communication with one another and with the mass of charged particles of the solid maintained in fluid condition in each zone. The apparent density of the mass of particles of solid material in these zones, which ranges from about 50% to about 90% of the bulk density of the mass of charged particles, is indicative of the intimate contact afforded the solid and the gas. Each particle within the fluid column is completely surrounded in an atmosphere of the gas which is constantly in motion. The maintenance of a plurality of fluid beds of controllably different degrees of density and agitation in the form of a fluid column makes possible a flexibility and efficiency of continuous operation not available in the prior art.

Our invention is applicable to a wide variety of solid-gas contacting operations in which the introduction of the gas into the mass of particles of the solid is for the purpose of effecting only agitation of the solid particles, of effecting a heat transfer between the solid and the gas, of effecting a reaction between the solid and the gas, or of promoting a reaction between two components of the fluidizing gas where the solid functions as a catalyst. The solid may be a single substance or a mixture of substances, depending upon the requirements and objectives of the solid-gas contacting process. The gas may be a single gas or a mixture of gases, depending likewise upon the requirements and objectives of the process as fully discussed hereinbefore. It will be understood, accordingly, that the terms "solid" and "gas" as used herein and in the claims includes either a single solid or gas or a plurality of solids or gases, or both. Moreover, the term "gas" is used herein and in the claims to include normally gaseous materials as well as the vapors of other materials which are normally liquid (such as water, alcohols, etc.) or normally solid (such as metallic zinc, etc.), but which can be vaporized at the temperature prevailing or maintained in the fluid column operation in accordance with our invention.

We claim:

1. In the method of effecting contact between a solid and a gas wherein a mass of discrete particles of the solid is expanded to fluid bed condition by the passage of the gas upwardly therethrough, the improvement which comprises maintaining the mass of particles in the form of a fluid column comprising at least two contiguous fluid beds of sufficiently different degrees of expanded fluid agitation to substantially prevent short-circuiting of the particles from one bed to another while permitting fluid flow of the particles by gravity progressively downwardly through said beds by (1) introducing into the lower portion of the mass only a portion of the total amount of gas introduced into the fluid column but in amount sufficient to support the mass of particles in said lower portion in an expanded fluid condition having an apparent density of about 75-90% of the unexpanded bulk density of the mass of particles prior to charging, and (2) introducing into an intermediate portion of the mass another substantial portion of the total amount of the gas introduced into the fluid column so as to support the mass of particles above the aforementioned mass in a more highly expanded and actively agitated fluid condition having an apparent density of about 55-75% of the unexpanded bulk density of the mass of particles prior to charging, the upper boundary of the fluidized column resembling that of a boiling liquid and being established exclusively by the rate of introduction of gas into said column with respect to the rate of charge of solid particles to the column.

2. In the method of effecting contact between a solid and a gas wherein a mass of discrete particles of the solid is expanded to fluid bed conditions by the passage of the gas upwardly therethrough, the improvement which comprises maintaining the mass of particles in the form of a fluid column comprising at least two contiguous fluid beds of sufficiently different degrees of expanded fluid agitation to substantially prevent short-circuiting of the particles from one bed to another while permitting fluid flow of the particles by gravity progressively downwardly through said beds (1) by introducing into the lower portion of the mass only a portion of the total amount of the gas introduced into the fluid column but in amount sufficient to support the mass of particles in said lower portion in an expanded fluid condition having an apparent density of about 75-90% of the unexpanded bulk density of the mass of particles prior to charging, (2) by introducing into the mass of particles a substantial distance above said first portion another substantial portion of the total amount of the gas introduced into the fluid column so as to maintain the mass of particles thereabove in a more highly expanded fluid condition having an apparent density of about 55-75% of the unexpanded bulk density of the mass of particles prior to charging, and (3) by introducing into the mass of particles a substantial distance above said second quantity still another substantial portion of the total amount of the gas introduced into the fluid column so as to maintain the mass of particles thereabove in a still more highly expanded and actively agitated fluid condition having an apparent density of about 50-60% of the unexpanded bulk density of the mass of particles prior to charging, the upper boundary of the fluidized column resembling that of a boiling liquid and being established exclusively by the rate of introduction of gas into said column with respect to the rate of charge of solid particles to the column.

3. The method according to claim 1 wherein a second mass of the particles of the solid having a cross-sectional area greater than the cross-sectional area of the first-mentioned mass is maintained above the first-mentioned mass and in direct communication therewith, said second mass of particles being maintained in an expanded fluid condition approximating that prevailing in the lowermost portion of the fluid column by the upward flow of gas leaving the upper end of the fluid column.

4. The method of roasting sulfide ore which comprises introducing discrete particles of the ore having a size falling within the range of through 6 and on 65 mesh into the upper portion of a vertically disposed chamber, supporting the mass of charge particles in the form of a fluid column within the chamber by (1) introducing into the lower end of the chamber a portion of roasting air comprising between about 15 and 50% of the total amount of roasting air and sufficient in amount to maintain the mass of charge particles therein in an expanded fluid condition having an apparent density of about 75-90% of the unexpanded bulk density of the mass of ore particles prior to charging, and (2) introducing into the charge adjacent the intermediate portion of the chamber another portion of the roasting air comprising at least about 50% of the total amount of roasting air and sufficient in amount to maintain the mass of charge particles in the chamber above the aforementioned mass in a more highly expanded and actively agitated fluid condition having an apparent density of about 55-75% of the unexpanded bulk density of the mass of ore particles prior to charging, the upper boundary of the fluidized column resembling that of a boiling liquid and being established exclusively by the rate of introduction of gas into said column with respect to the rate of charge of solid particles to the column, effecting ignition of the ore in the atmosphere of air within the chamber, removing sulfur dioxide-bearing roaster gases from the upper portion of the chamber, and withdrawing roasted ore from the lower end of the chamber.

5. The method according to claim 4 wherein a mass of said charge particles having a cross-sectional area greater than the cross-sectional area of the chamber is maintained above the upper end of the chamber and in direct communication therewith, said mass of charge particles being maintained in an expanded fluid condition by the upward flow of gases leaving the upper end of the chamber.

6. The method of roasting sulfide ore which comprises introducing discrete particles of the ore having a size falling within the range of through 6 mesh and on 65 mesh into the upper portion of a vertically disposed chamber, supporting the mass of charge particles in the form of a fluid column within the chamber (1) by introducing into the lower end of the chamber a portion of roasting air comprising between about 15 and 50% of the total amount of roasting air and sufficient in amount to maintain the mass of charge particles thereabove in an expanded fluid condition having an apparent density of about 75-90% of the unexpanded bulk density of the mass of ore particles prior to charging, (2) by introducing into the chamber a substantial distance above said first portion another portion of the roasting air comprising at least about 50% of the total amount of roasting air and sufficient in amount to maintain the mass of charge particles thereabove in a more highly expanded fluid condition having an apparent density of about 55-75% of the unexpanded bulk density of the mass of ore particles prior to charging, and (3) by introducing into the chamber a substantial distance above said second portion still another portion of the roasting air comprising between about 10 and 40% of the total amount of roasting air and sufficient in amount to maintain the mass of charge particles thereabove in a still more highly expanded and actively agitated fluid condition having an apparent density of about 50-60% of the unexpanded bulk density of the mass of ore particles prior to charging, the upper boundary of the fluidized column resembling that of a boiling liquid and being established exclusively by the rate of introduction of gas into said column with respect to the rate of charge of solid particles to the column, effecting ignition of the ore in the atmosphere of air within the chamber, withdrawing sulfur dioxide-bearing roaster gases from the upper portion of the chamber, and withdrawing roasted ore from the lower end of the chamber.

7. The method of roasting sulfide ore which comprises introducing discrete particles of the ore having a size distribution falling within the range of through 8 and on 35 mesh into the upper portion of a vertically disposed and mechanically uninterrupted chamber, introducing into the chamber in three separate portions a total amount of air substantially that theoretically required to effect complete roasting of the ore, one portion comprising about 20% of the total air and being introduced into the lowermost portion of the chamber, a second portion comprising about 60% of the total air and being introduced into the chamber a substantial distance above the first portion, and a third portion comprising about 20% of the total air and being introduced into the chamber a substantial distance above the second portion but a substantial distance below the upper end of the chamber, the mass of charge particles being maintained in the form of a fluid column within the chamber composed of three zones each positioned respectively above the level of introduction of each of said three portions of air and being maintained in an expanded fluid condition by the upward flow of said air and gaseous products of the roasting of the ore particles in the presence of the air, the upper boundary of the fluidized column resembling that of a boiling liquid and being established exclusively by the rate of introduction of gas into said column with respect to the rate of charge of solid particles to the column, effecting ignition of the ore in the atmosphere of air within the chamber, withdrawing sulfur dioxide-bearing roaster gases from the upper portion of the chamber, and withdrawing roasted ore from the lower end of the chamber.

HOWARD M. CYR.
CHARLES W. SILLER.
TRACEY F. STEELE.

REFERENCES CITED

The following references are of record in the file of this patent:

UNITED STATES PATENTS

| Number | Name | Date |
| --- | --- | --- |
| 2,373,008 | Becker | Apr. 3, 1945 |
| 2,394,651 | Alther | Feb. 12, 1946 |
| 2,409,476 | Creelman et al. | Oct. 15, 1946 |
| 2,430,443 | Becker | Nov. 11, 1947 |
| 2,444,990 | Hemminger | July 13, 1948 |
| 2,475,984 | Owen | July 12, 1949 |

FOREIGN PATENTS

| Number | Country | Date |
| --- | --- | --- |
| 296,751 | Great Britain | Sept. 3, 1928 |
| 301,975 | Great Britain | Dec. 13, 1928 |